(12) United States Patent
Kim

(10) Patent No.: US 11,935,518 B2
(45) Date of Patent: Mar. 19, 2024

(54) JOINT WORKS PRODUCTION METHOD AND SERVER USING COLLECTIVE INTELLIGENCE

(71) Applicant: Bang Hyeon Kim, Seoul (KR)

(72) Inventor: Bang Hyeon Kim, Seoul (KR)

(*) Notice: Subject to any disclaimer, the term of this patent is extended or adjusted under 35 U.S.C. 154(b) by 124 days.

(21) Appl. No.: 17/201,146

(22) Filed: Mar. 15, 2021

(65) Prior Publication Data

US 2021/0335343 A1   Oct. 28, 2021

(30) Foreign Application Priority Data

Apr. 24, 2020  (KR) .................... 10-2020-0049998

(51) Int. Cl.
| | |
|---|---|
| G10L 15/08 | (2006.01) |
| G06F 3/01 | (2006.01) |
| G06N 3/045 | (2023.01) |
| G06N 3/08 | (2023.01) |
| G10L 15/16 | (2006.01) |
| G10L 25/63 | (2013.01) |

(52) U.S. Cl.
CPC ............ *G10L 15/083* (2013.01); *G06F 3/015* (2013.01); *G06N 3/045* (2023.01); *G06N 3/08* (2013.01); *G10L 15/16* (2013.01); *G10L 25/63* (2013.01)

(58) Field of Classification Search
CPC ....... G10L 15/083; G10L 15/16; G10L 25/63; G06F 3/015; G06N 3/0454; G06N 3/08
See application file for complete search history.

(56) References Cited

U.S. PATENT DOCUMENTS

| | | | | |
|---|---|---|---|---|
| 5,841,977 | A * | 11/1998 | Ishizaki | ............. H04Q 11/0428 709/224 |
| 7,464,034 | B2 * | 12/2008 | Kawashima | .......... G10L 13/033 704/266 |
| 2018/0308487 | A1 * | 10/2018 | Goel | ................... G10L 15/1815 |
| 2020/0097879 | A1 * | 3/2020 | Venkata | ......... G06Q 10/063114 |
| 2021/0005187 | A1 * | 1/2021 | Shin | .................... G10L 15/1822 |

FOREIGN PATENT DOCUMENTS

| | | |
|---|---|---|
| JP | 2017-192416 A | 10/2017 |
| KR | 10-2018-0048552 A | 5/2018 |
| KR | 10-2019-0130904 A | 11/2019 |

OTHER PUBLICATIONS

Machine translation of KR20180048552 (Year: 2018).*
Machine translation of KR20190130904 (Year: 2019).*
Machine translation of JP2017192416 (Year: 2017).*
Canazza, Sergio, et al. "Modeling and control of expressiveness in music performance." Proceedings of the IEEE 92.4 (2004): 686-701. (Year: 2004).*
Office Action dated Apr. 28, 2022, issued in counterpart KR application No. 10-2020-0049998, with English translation. (11 pages).

* cited by examiner

*Primary Examiner* — Douglas Godbold
*Assistant Examiner* — Edward Tracy, Jr.
(74) *Attorney, Agent, or Firm* — WHDA, LLP

(57) ABSTRACT

A joint works production method of a joint works production server using collective intelligence includes receiving a subject of joint works from participants of the joint works production, receiving preference information on the received subject from other participants, determining whether to adopt the subject of the joint works according to the received preference information, and classifying, when the subject of the joint works is adopted, the adopted subject (Continued)

of the joint works by subjects and storing the classified subject.

9 Claims, 4 Drawing Sheets

JOINT WORKS PRODUCTION METHOD AND SERVER USING COLLECTIVE INTELLIGENCE

CROSS-REFERENCE TO RELATED APPLICATION

This application claims the priority and benefit of Korean Patent Application No. 10-2020-0049998 filed on Apr. 24, 2020, with the Korean Intellectual Property Office, the disclosure of which is incorporated herein by reference.

BACKGROUND OF THE INVENTION

1. Field of the Invention

The present invention relates to a joint works production method and server using collective intelligence.

2. Description of the Related Art

With the development of the Internet, various communities (e.g., cafes, personal blogs, or personal homepages) allowing users to participate and create stories (or novels) through PCs on the web have been built.

In the case of a co-creating community, if an operator posts any one subject (e.g., a novel, a cartoon, a scenario of a movie or play, or a subject of a story for a broadcast script), a number of community participants may add stories to the posted subject or contents in a relay manner to create a single outcome.

In particular, in recent years, with the development of various types of smart devices, a method in which several people create a novel (hereinafter, joint works) using a novel creation application and users who want to use it consume, buy, and download desired joint works using a portable terminal device such as a smartphone has been developed.

However, as the number of co-authors increases, a difference in the degree of related knowledge or personal writing style increases, making it difficult to secure unity on subjects of joint works.

For example, a causal relationship between stories is damaged according to a difference in understanding of the stories and a number of non-logical structures occur, resulting in a degradation of quality of overall joint works.

Therefore, a method for producing joint works using collective intelligence more effectively is required.

SUMMARY

An aspect of the present invention may provide joint works production method and service using collective intelligence based on artificial neural networks and brainwaves.

According to an aspect of the present invention, a joint works production method of a joint works production server using collective intelligence includes: receiving a subject of joint works from participants of the joint works production; receiving preference information on the received subject from other participants; determining whether to adopt the subject of the joint works according to the received preference information; and classifying, when the subject of the joint works is adopted, the adopted subject of the joint works by subjects and storing the classified subject.

The joint works production method may further include: receiving a candidate episode from each of the participants who selected the same subject among the classified subjects from the participants; converting each of the received candidate episodes into voice data; and transmitting each candidate episode converted into voice data to evaluators.

The joint works production method may further include: receiving brainwave information indicating a change in brainwaves of the evaluators according to the candidate episode converted into voice from the evaluators.

The joint works production method may further include: creating an impression index that quantifies the degree to which the evaluators are impressed by the episode based on the received brainwave information of the evaluators; and selecting episodes suitable for the subject of the joint works among the candidate episodes based on the created impression index.

In the converting into the voice data, an emotional state of each candidate episode may be analyzed using a first neural network model trained to determine an emotional state by dividing a section in which the candidate episode is impressed based on the impression index, and a voice signal may be adjusted according to the analyzed emotional state and converted into voice data.

The joint works production method may further include: creating a basic manuscript by arranging the sequence of selected episodes using a second neural network model trained to determine a correlation between the selected episodes based on ontology.

The joint works production method may further include: determining a stake, in the basic manuscript, of the participants who participated in the basic manuscript.

According to another aspect of the present invention, a joint works production server using collective intelligence includes: a subject receiving unit configured to receive a subject of joint works from participants of the joint works production; a subject selecting unit configured to vote for preference on the received subject from other participants and to determine whether to adopt the subject of the joint works according to a preference voting result; and a subject classifying unit configured to classify, when the subject of the joint works is adopted, the adopted subject of the joint works by subjects and to store the classified subject.

The joint works production server may further include: an episode receiving unit configured to receive a candidate episode from each of the participants who selected the same subject among the classified subjects from the participants; and a voice data generating unit configured to convert each of the received candidate episodes into voice data and to transmit each candidate episode converted into voice data to evaluators.

The joint works production server may further include: an impression index generating unit configured to receive brainwave information indicating a change in brainwaves of the evaluators according to the candidate episode converted into voice from the evaluators, wherein the impression index generating unit may create an impression index that quantifies the degree to which the evaluators are impressed by the episode based on the received brainwave information of the evaluators.

The joint works production server may further include: an episode selecting unit configured to select episodes suitable for the subject of the joint works among the candidate episodes based on the created impression index.

The voice data generating unit may analyze an emotional state of each candidate episode using a first neural network model trained to determine an emotional state by dividing a section in which the candidate episode is impressed based on the impression index, adjust a voice signal according to the analyzed emotional state, and convert the voice signal into voice data.

The joint works production server may further include: a manuscript creating unit configured to create a basic manuscript by arranging the sequence of selected episodes using a second neural network model trained to determine a correlation between the selected episodes based on ontology.

The joint works production server may further include: a stake determining unit configured to determine a stake, in the basic manuscript, of the participants who participated in the basic manuscript.

DETAILED DESCRIPTION

The following description illustrates only a principle of the present invention. Therefore, those skilled in the art may implement the principle of the present invention and devise various apparatuses included in the spirit and scope of the present invention although not clearly described or shown in the present specification. In addition, it is to be understood that all conditional terms and exemplary embodiments mentioned in the present specification are obviously intended only to allow those skilled in the art to understand a concept of the present invention in principle, and the present invention is not limited to exemplary embodiments and states particularly mentioned as such.

The above-mentioned objects, features, and advantages will become obvious from the following detailed description provided in relation to the accompanying drawings. Therefore, those skilled in the art to which the present invention pertains may easily practice a technical idea of the present invention.

Further, in describing the present invention, in the case in which it is judged that a detailed description of a well-known technology associated with the present invention may unnecessarily make unclear the gist of the present invention, it will be omitted. Hereinafter, various exemplary embodiments of the present invention will be described in detail with reference to the accompanying drawings.

Figure 1:
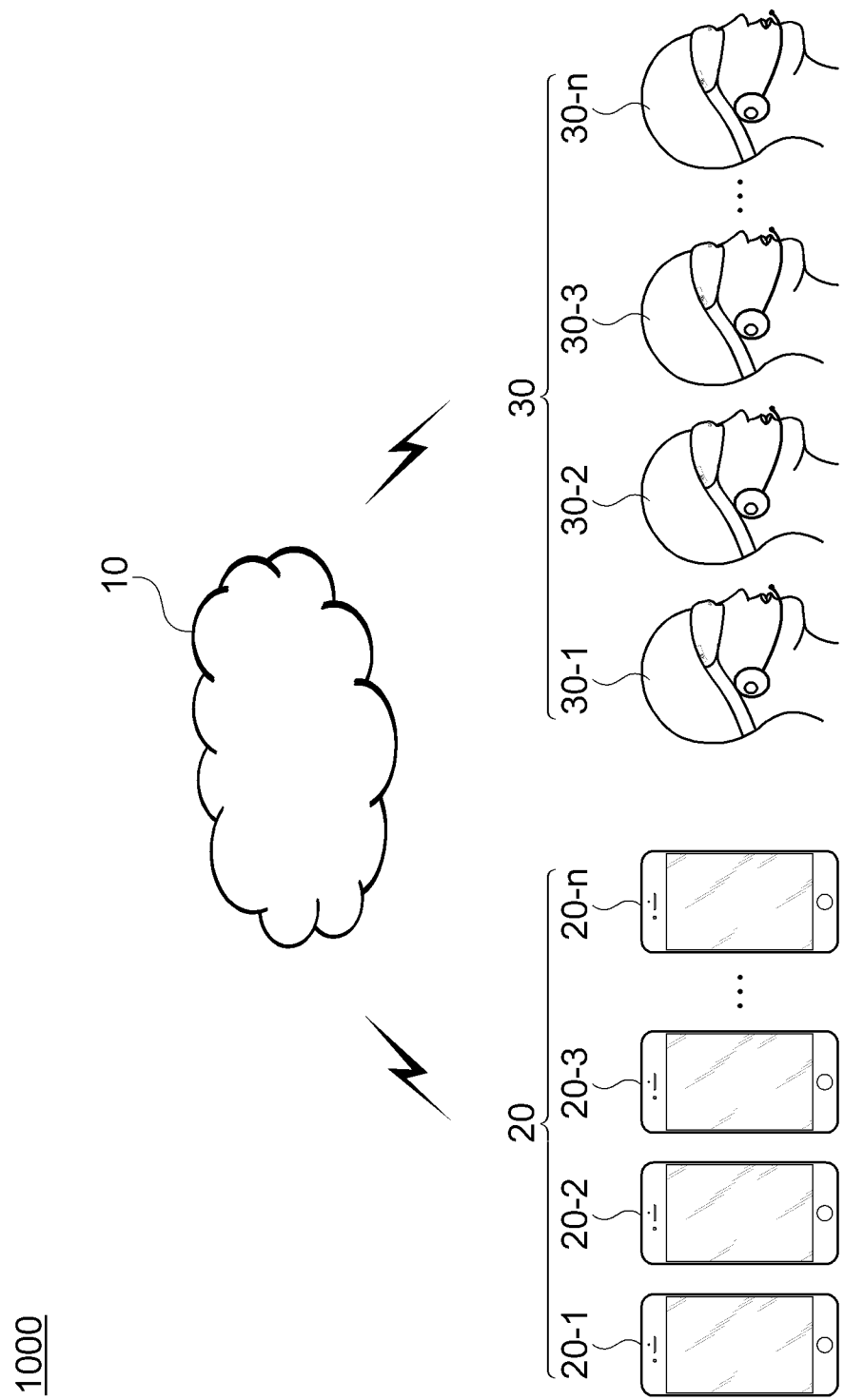
FIG. 1 is a conceptual diagram illustrating a joint works production system according to an embodiment of the present invention.

FIG. 1 is a conceptual diagram illustrating a joint works production system according to an embodiment of the present invention.

Referring to FIG. 1, a joint works production system 1000 may include a joint works production server 10, a user terminal 20, and a brainwave measuring device 30 in order to produce joint works.

The joint works production server 10 may perform a function of producing joint works by communicating with the user terminal 20 and the brainwave measuring device 30. Here, the joint works are works created jointly by two or more people and may include novels, poems, theses, lectures, speeches, scripts, and the like.

The user terminal 20 (20-1, 20-2, ... , 20-n) may be a terminal device of a participant in the production of joint works, which may be implemented as a smartphone, a tablet computer, a notebook computer, a personal computer (PC), a personal digital assistant (PDA), a portable multimedia player (PMP) having a wired/wireless communication function or may be implemented as a wearable device such as smart glasses or a smart watch that may be worn on the user's body. Specifically, the user terminal 20 may perform a function of transmitting data necessary for the production of joint works such as a subject or episode of the joint works by communicating with the joint works production server 10.

For example, the participant in the production of the joint works may transmit a subject or episode of the joint works to the joint works production server 10 using the user terminal 20. Here, the subject of the joint works may refer to a central meaning, intention, world view, central idea, etc. that integrates the contents of the joint works and may also refer to a core storyline or a description of a core character. In addition, the episode of the joint works, which is part of a story that corresponds to the subject of the joint works, refers to a piece of a story. That is, the joint works may include multiple episodes.

In addition, the user terminal 20 may perform a function of evaluating preference of the subject of the joint works.

For example, the participant in the joint works production may vote for a preference on the subject of several joint works received by the joint works production server 10 using the user terminal 20.

The brainwave measuring device 30 (30-1, 30-2, ... , 30-n) is a terminal device of evaluators who evaluate an episode constituting joint works or a subject of the joint works, may have a wired/wireless communication function and may perform a function of measuring brainwaves and a function of outputting voice data.

Specifically, the brainwave measuring device 30 may receive voice data from the joint works production server 10, provide the received voice data to an evaluator, measure the brainwave information of the evaluator according to the voice data, and transmit the measured brainwave information to the joint works production server 10. Here, the voice data may be data obtained by converting an episode of joint works into voice.

The brainwave information is information representing a change in brainwaves that occurs when evaluators listen to voice data, and may include a waveform of a brainwave, an amount of change in the brainwave, the number of brainwave detections of a specific frequency, a time for brainwave detection of a specific frequency, etc. Here, the brainwave of a specific frequency may include at least one of an alpha wave, a beta wave, a delta wave, and a theta wave. Preferably, the brainwave of a specific frequency may be a theta wave, and may refer to only a 7 to 8 Hz band in the theta wave. Here, the 7 to 8 Hz band in the theta wave is a brainwave measured when creativity and learning are excellent, and may be used to indirectly confirm that creativity of the voice data provided to the evaluator is excellent or that concentration of the evaluator is increased.

In addition, in the present embodiment, the user terminal 20 and the brainwave measuring device 30 are illustrated as separate devices but may also be implemented as a single device, for example, as a wearable device interworking with a smartphone and may measure a brainwave through an application installed in the smartphone or recognize an impression index.

Hereinafter, the joint works production server 10 will be described in detail with reference to FIG. 2.

Figure 2:
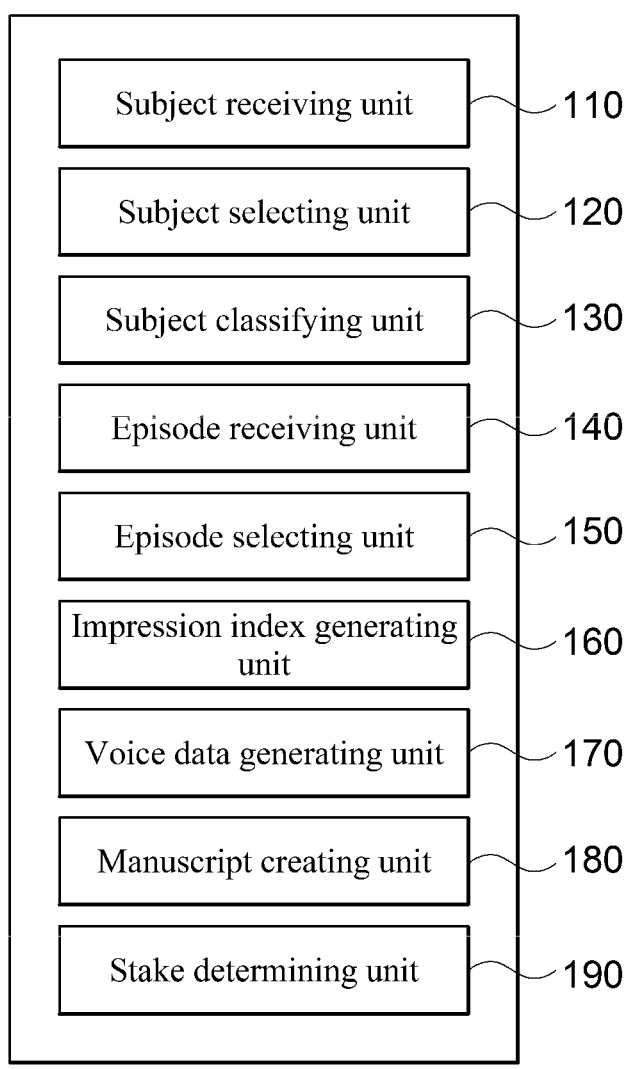
FIG. 2 is a block diagram illustrating a joint works production server according to an embodiment of the present invention.

FIG. 2 is a block diagram illustrating the joint works production server 10 according to an embodiment of the present invention.

Referring to FIG. 2, the joint works production server 10 may include all or part of a subject receiving unit 110, a subject selecting unit 120, a subject classifying unit 130, an episode receiving unit 140, an episode selecting unit 150, an impression index generating unit 160, a voice data generating unit 170, a manuscript creating unit 180, and a stake determining unit 190.

The subject receiving unit 110 may perform a function of receiving a subject of joint works from the user terminal 20. That is, the subject receiving unit 110 may receive the subject of the joint works from a participant in the production of the joint works.

The subject selecting unit 120 may perform a function of receiving preference information on the subject of the joint works received from the user terminal 20. That is, the subject selecting unit 120 may receive preference information on the subject of the joint works received from various participants in the production of the joint works. Here, the preference information may be information indicating a preference for the corresponding subject and include an objective score (e.g., 6/10 points), a subjective opinion, etc.

In addition, the subject selecting unit 120 may perform a function of determining whether to adopt the received subject of the joint works based on the received preference information. Specifically, the subject selecting unit 120 may determine whether to select the subject based on the sum of preference information received from participants.

Here, the subject selecting unit 120 may add up the preference information by varying weights according to the participants. For example, the subject selecting unit 120 may add up a weight of 1.5 to preference information of participant A who is a writer and a weight of 0.7 to preference information of participant B who is an ordinary person.

The subject classifying unit 130 may perform a function of classifying and storing the subject of the received joint works. Specifically, when the received subject of the joint works is adopted, the subject classifying unit 130 may classify and store the adopted subject of the joint works according to genre, subject, preferred age group, preferred gender, and the like.

In addition, if the received subject of the joint works is not adopted, the subject classifying unit 130 may discard the corresponding subject or separately manage or store the corresponding subject from an adopted subject. Here, the classified subject of the joint works may be inquired about and confirmed through the user terminal 20.

Meanwhile, the subject classifying unit 130 may classify not only the subject of the joint works but also episodes selected for each subject according to a preset criterion. Here, the preset criterion may be a descending order of an impression index, the number of sentences of an episode, and the like.

The episode receiving unit 140 may perform a function of receiving a candidate episode for the classified and stored subject of the joint works. Specifically, the episode receiving unit 140 may receive a candidate episode for the subject of the joint works from the user terminal 20.

For example, the episode receiving unit 140 may receive candidate episodes of each of participants from the participants who selected the same subject among the classified subjects of the joint works. Here, the candidate episode, as a part of a story that corresponds to the subject of the joint works, refers to a fragmented story that has not been verified by evaluators.

The voice data generating unit 170 may perform a function of converting the received candidate episode into voice data and transmitting the converted voice data to evaluators. That is, the voice data generating unit may convert a received candidate episode into voice data and transmit the converted voice data to the brainwave measuring device 30. Here, the voice data may be obtained by converting the candidate episode into voice.

Specifically, the voice data generating unit 170 may generate voice data by analyzing an emotional state of the candidate episode using a first neural network model and adjusting a voice signal according to the analyzed emotional state. Specifically, the voice data generating unit 170 may perform voice processing to increase delivery power of an actual story such as loudness, a tone of sound, etc, as a voice signal.

Here, the first neural network model may be a model trained to classify a section in which people are impressed in a candidate episode based on an impression index and determine an emotional state. The impression index is a numerical value indicating the degree to which the evaluators are impressed by the candidate episode based on the brainwave information of the evaluators. The first neural network model may determine a part in the provided voice data where the impression index is expected to be high, and perform speech processing.

Hereinafter, the first neural network model will be described with reference to FIG. 3.

Figure 3:
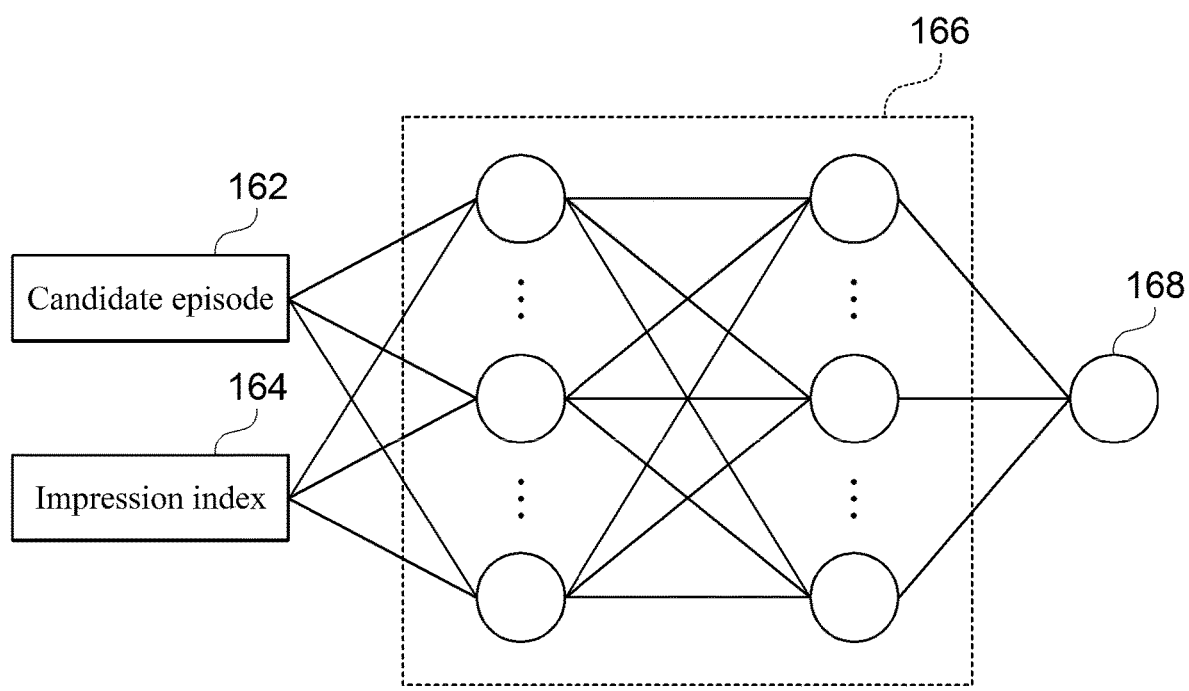
FIG. 3 is an exemplary diagram illustrating a structure of a first neural network model according to an embodiment of the present invention.

FIG. 3 is an exemplary diagram illustrating a structure of a first neural network model according to an embodiment of the present invention.

Referring to FIG. 3, FIG. 3 is a diagram conceptually illustrating a structure of the first neural network model described above, which may receive both a candidate episode 162 and an impression index 164 corresponding to the candidate episode 162 as learning data.

For example, the candidate episode 162 may include a combination of sentences including words. If a dimension of a vector representing features of a word is d and the candidate episode 162 includes K sentences including n words, learning data may include K n*d matrices.

In addition, here, the impression index 164 may be tagged to a feature value of a specific sentence or a word of a specific sentence providing an impression so as to be provided in a supervised learning method.

Here, the impression index 164 may be created based on the brainwave information, and the first neural network model may also use, as learning data, brainwave indexes of evaluators who have received voice data for the candidate episode 162 according to the present embodiment.

The learning data input to the first neural network model 166 may be subjected to a convolution operation according to a filter having a predetermined size, while passing through each layer in the neural network. In addition, the first neural network model 166 may input a feature map created by the convolution operation into a fully connected layer that generates a one-dimensional output, and generate a final output 168 through a nonlinear function.

In addition, semantic analysis may be performed using a window. For example, a word that creates an impression may depend on a neighboring word, and therefore, it is possible to recognize a meaning by learning a pattern of words located before and after the corresponding word in a sentence based on the window.

Further, the first neural network model according to the present embodiment may learn to classify a specific word or a pattern of words as a section in which people are impressed in an input candidate episode, and output a result of determining an emotional state that the candidate episode affects on the user.

Here, the emotional state may refer to emotions that people who listen to the candidate episode feel, and may include interest, engagement, confusion, frustration, boredom, hopefulness, satisfaction, and disappointment.

For example, when a candidate episode is input, the first neural network model may determine an emotional state of the candidate episode. Here, the emotional state may be an overall emotional state of the candidate episode. In addition, the emotional state may be classified for each section of the candidate episode. Here, the section may refer to one sentence, passage, phrase, or word of the episode.

Referring back to FIG. 2, the voice data generating unit 170 may generate voice data by adjusting the voice signal based on an emotional state analyzed by the first neural network model. Here, the voice signal may include at least one of a loudness, an intensity, a tempo, and an intensity change pattern of the voice. Here, the tempo of the voice may refer to a speed of appearance of the voice, and the intensity change pattern may refer to an intonation in each word of the voice.

For example, when it is determined that the emotional state of the candidate episode is sad, the voice data generating unit 170 may generate voice data by converting the candidate episode into voice such that an emotional state of sadness appears by adjusting at least one of the intensity, the tempo, and the intensity change pattern of the voice.

Through this, the voice data may more properly convey the intention of the candidate episode to the evaluators, and the evaluators may be focused more on the candidate episode.

The impression index generating unit 160 may receive brainwave information from evaluators who have listened to the voice data. Here, the brainwave information may include changes in brainwaves of evaluators according to the voice data. That is, the impression index generating unit 160 may receive brainwave information of candidates who have listened to the voice data obtained by converting the candidate episode into voice from the brainwave measuring device 30. Here, the brainwave information may include a waveform of a brainwave, an amount of change in the brainwave, the number of brainwave detections of a specific frequency, and a time for brainwave detection of the specific frequency, etc. when the evaluators have listened to the voice data.

In addition, the impression index generating unit 160 may create an impression index based on the brainwave information received from the evaluators. Here, the impression index is a numerical value indicating the degree to which the evaluators were impressed by the voice data converted from the candidate episode. In addition, the impression index may be a numerical value of the whole of one candidate episode or may be a numerical value for each section of the candidate episode.

Specifically, the impression index generating unit 160 may calculate the impression index based on a waveform of the brainwave, the amount of change in the brainwave, the number of brainwave detections of a specific frequency, and a time for the brainwave detection of a specific frequency included in the brainwave information. For example, the impression index generating unit 160 may generate a higher impression index as the time for detecting the brainwave of a specific frequency increases. As another example, the impression index generating unit 160 may generate a higher impression index as the number of brainwave detections of a specific frequency increases.

In addition, the impression index generating unit 160 may generate an impression index by varying weights for components included in the brainwave information. For example, the impression index generating unit 160 may generate the impression index by applying a higher weight to a time for brainwave detection of a specific frequency (7 to 8 Hz band in a theta wave) than the amount of change in the brainwave.

The episode selecting unit 150 may perform a function of selecting an episode suitable for a subject of the joint works among candidate episodes based on the impression index generated by the impression index generating unit 160.

Specifically, the episode selecting unit 150 may select some of the candidate episodes in order of the impression indexes, as episodes suitable for the subject of the joint works.

For example, the episode selecting unit 150 may select top 80 percent of candidate episodes, among candidate episodes having a high impression index, as episodes suitable for the subject of the joint works. As another example, the episode selecting unit 150 may select candidate episodes, excluding top 10 percent and and bottom 10 percent of the candidate episodes having a high impression index, as episodes suitable for the subject of the joint works.

Meanwhile, selection criteria of the episode selecting unit 150 may be applied differently according to the subject of the joint works.

The manuscript creating unit 180 may create a draft manuscript with the episode selected by the episode selecting unit 150 using a second neural network model.

Specifically, the manuscript creating unit 180 may create a basic manuscript by arranging the sequence of selected episodes or combining some of them using the second neural network model.

Here, ontology, as a model that abstracts and stakes what people think about things, refers to a technology of explicitly defining a type of standardized concept or constraints on use. That is, through ontology, a concepts, characteristics, and relationships of words used in a certain range are expressed to explicitly reveal general knowledge about words, and a meaning of sentences may be recognized through definition of a relationship between words.

Here, the second neural network model may be learned to determine a correlation between episodes selected based on ontology. Here, the correlation between episodes may refer to a logical structure between episodes or sentences within an episode and may refer to a concept including six-and-a-half principles of episodes (when, who, how, what, where, and why), flow of time, flow of an emotional change, etc.

For example, the second neural network model may create a draft manuscript by arranging episodes A, B, and C selected based on ontology in the order of episode C, episode A, and episode B, and may create one basic manuscript by combining a part of episode C and a part of episode B. Here, the basic manuscript may refer to a draft of joint works.

In addition, the second neural network model may be trained to determine a correlation between selected episodes by additionally considering an episode composition. Here, the episode structure, as information of an episode or between episodes, may include the number of words, the number of verbs, the number of adjectives, the number of nouns, and the number of sentences of an episode, a coincidence ratio of the same words between episodes, and the like.

In addition, the second neural network model may use the first neural network model in a composition of an episode.

That is, the second neural network model may create a manuscript by organizing order of episodes, but it is also possible to infer the order of the episodes with the highest emotional index by predicting an impression index of the created manuscript through the first neural network model.

The stake determining unit 190 may perform a function of determining a stake for the joint works. Specifically, the stake determining unit 190 may determine the stake of each participant who participates in a basic manuscript according to a stake distribution criterion. Here, the stake distribution criterion may be to divide the stakes according to the ratio of episodes used in the basic manuscript or divide the stakes so that participants of the episodes used in the basic manuscript have the same stake. In this case, it may be a ratio excluding a fixed stake of the joint works of a principal (host) who provides the joint works production server.

For example, the joint works production server side may have a 50% stake in the joint works, and 5 joint works participants may each have a 10% stake.

Meanwhile, the aforementioned stake distribution criterion may be an example and may be applied differently as necessary.

In addition, the stake determining unit 190 may determine the stake by comprehensively considering a composition order of the determined episode, an impression index of the episode, and the like.

A finally completed manuscript may be modified by a professional writer in the production server 10, and the stake determining unit 190 may determine the stake for the final modification of the professional writer.

Hereinafter, a joint works production method of the joint works production server 10 will be described with reference to FIG. 4.

Figure 4:
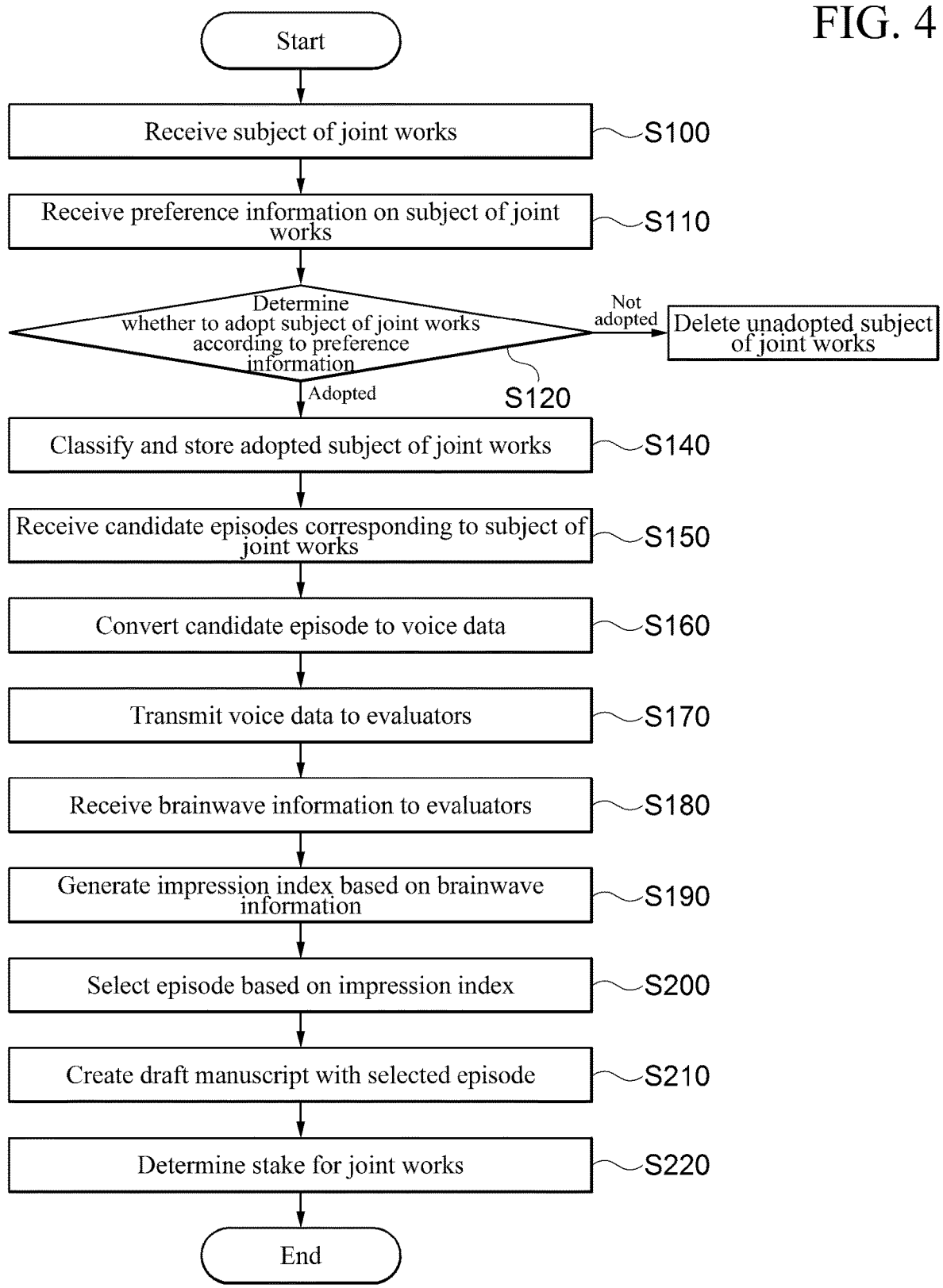
FIG. 4 is a flowchart illustrating a joint works production method according to an embodiment of the present invention.

FIG. 4 is a flowchart illustrating a joint works production method according to an embodiment of the present invention.

Referring to FIG. 4, the joint works production server 10 using collective intelligence may receive a subject of joint works from participants of a joint works production (S100).

In addition, the joint works production server 10 may receive preference information for subjects received from other participants (S110). That is, in step S110 of receiving the preference information, the joint works production server 10 may receive preference information on a subject of the joint works received from various participants in the joint works production.

In addition, the joint works production server 10 may determine whether to adopt the subject of the joint works based on the received preference information (S120). By adopting the subject of the joint works based on the preference information, a subject for the joint works which is more popular and highly preferred may be advantageously selected.

In addition, if the subject of the joint works is not adopted, the joint works production server 10 may delete the subject of the corresponding joint works or separately store and manage the subject that has not been adopted (S130).

In addition, when the subject of the joint works is adopted, the joint works production server 10 may classify and store the subject of the adopted joint works by subjects (S140).

By classifying the subject of the joint works in this manner, management of the joint works may be facilitated and it is easy for several participants to select the subject of the joint works.

In addition, the joint works production server 10 may receive a candidate episode of each participant from the participants who select the same subject among the classified subjects (S150).

Specifically, in step S150 of receiving a candidate episode (S150), the joint works production server 10 may receive candidate episodes corresponding to the subject of the joint works.

In addition, the joint works production server 10 may convert each of the input candidate episodes into voice data (S160).

Specifically, in step S160 of converting the voice data, the joint works production server 10 may analyze an emotional state of a candidate episode using a first neural network model trained to determine an emotional state by differentiating an impressive section of the candidate episode based on the impression index, and convert each candidate episode into voice data by adjusting a voice signal according to the analyzed emotional state. Here, the first neural network model has been described above, and thus, a redundant description thereof will be omitted.

In addition, the joint works production server 10 may transmit each candidate episode converted into voice data to the evaluators (S170).

In addition, the joint works production server 10 may receive the brainwave information indicating a change in brainwave of the evaluators according to the candidate episode converted into voice from the evaluators (S180).

In addition, the joint works production server 10 may create an impression index as a numerical value indicating the degree to which the evaluators are impressed by the episode based on the received brainwave information of the evaluators (S190).

In addition, the joint works production server 10 may select an episode suitable for the subject of the joint works among the candidate episodes based on the created impression index (S200).

In addition, the joint works production server 10 may create a basic manuscript by arranging the order of the selected episodes using the second neural network model trained to determine a correlation between the selected episodes based on ontology (S210). As described above, the present invention has the advantage of producing joint works with a higher degree of completion of a logical structure using the second neural network model.

In addition, the joint works production server 10 may determine a stake, in the basic manuscript, of the participants who participate in the basic manuscript (S220).

In addition, after the stake in the manuscript is determined, the basic manuscript may be refined and published. Here, separate professional writers may refine the basic manuscript.

As such, the present invention has the advantage of supplying various works to the market by producing joint works by a number of participants.

Further, in addition to providing voice data to evaluators to measure the impression index with brainwaves as in the embodiment described above, in an additional embodiment, an episode may be directly provided as an e-book type text and an impression index may be received by brainwave from an evaluator who has read the episode through text to select an episode.

Therefore, instead of processing the voice data as a result of calculating the impression index of the first neural network model, it is also possible to perform image processing to enhance readability by a text display method.

As described above, the present invention has the advantage of preventing a dispute over a profit of joint works by distributing the stakes in advance for completed joint works.

In addition, the present invention described above has the advantage of producing creative joint works using a neural network model.

In addition, the present invention has an advantage of fairly selecting an episode from users by selecting an episode using brainwave information.

Meanwhile, a computer-readable recording medium storing a program for executing the joint works production method of the joint works production server described above may be formed.

In addition, a program for executing the joint works production method of the joint works production server described above may be configured.

Meanwhile, in the specification and the claims, terms such as "first", "second", "third", "fourth", and the like, if any, will be used to distinguish similar components from each other and be used to describe a specific sequence or a generation sequence, but is not necessarily limited thereto. It may be understood that these terms are compatible with each other under an appropriate environment so that exemplary embodiments of the present invention to be described below may be operated in a sequence different from a sequence shown or described herein. Likewise, in the present specification, in the case in which it is described that a method includes a series of steps, a sequence of these steps suggested herein is not necessarily a sequence in which these steps may be executed. That is, any described step may be omitted and/or any other step that is not described herein may be added to the method.

In addition, terms "module" and "unit" for components used in the present specification are used only in order to easily make the specification. Therefore, these terms do not have meanings or roles that distinguish from each other.

Terms used in the present disclosure are for explaining exemplary embodiments rather than limiting the present invention. Unless explicitly described to the contrary, a singular form includes a plural form in the present specification. The word "comprise" and variations such as "comprises" or "comprising," will be understood to imply the inclusion of stated constituents, steps, operations, and/or elements but not the exclusion of any other constituents, steps, operations and/or elements.

The description above is merely illustrating the technical spirit of the present invention, and various changes and modifications may be made by those skilled in the art without departing from the essential characteristics of the present invention. Therefore, the embodiments of the present invention described above may be implemented separately or in combination with each other.

Therefore, the embodiments disclosed in the present invention are intended to illustrate rather than limit the scope of the present invention, and the scope of the technical spirit of the present invention is not limited by these embodiments. The scope of the present invention should be construed by claims below, and all technical spirits within a range equivalent to claims should be construed as being included in the right scope of the present invention As described above, according to the present invention, it is possible to supply various works to the market by allowing a number of participants to produce joint works.

In addition, the present invention has the effect of preventing a dispute over a profit of joint works by distributing stakes in advance for a completed joint work.

In addition, the present invention has the effect of producing a creative joint works using a neural network model.

In addition, the present invention has the effect of fairly selecting an episode from users by selecting the episode using brainwave information.

In addition, the present invention has the effect of producing joint works with a higher degree of completion of a logical structure using a neural network model.

Further, according to the various exemplary embodiments of the present invention described above, it is possible to provide the map service to which the newest road environment is applied to the users by transmitting the map data which is updated in real time to the vehicles positioned on the road.

Although exemplary embodiments of the present invention have been illustrated and described hereinabove, the present invention is not limited to the above-mentioned specific exemplary embodiments, but may be variously modified by those skilled in the art to which the present invention pertains without departing from the scope and spirit of the present invention as disclosed in the accompanying claims. These modifications should also be understood to fall within the scope of the present invention.

What is claimed is:

1. A joint works production method of a joint works production server using collective intelligence, the joint works production method comprising:
   receiving a subject of joint works from participants of the joint works production;
   classifying, when the subject of the joint works is adopted, the adopted subject of the joint works by subjects;
   receiving a candidate episode from each of the participants who selected the same subject among the classified subjects from the participants;
   converting each of the received candidate episodes into voice data;
   transmitting each candidate episode converted into the voice data to evaluators;
   receiving brainwave information indicating a change in brainwaves of the evaluators according to the candidate episode converted into voice from the evaluators;
   calculating impression indexes by applying a higher weight to a time for brainwave detection of a specific frequency than an amount of change in the brainwaves;
   selecting episodes among the candidate episodes in order of the impression indexes; and
   creating a manuscript by arranging a sequence of selected episodes using a second neural network model trained to determine a correlation between the selected episodes based on ontology;
   wherein, in the converting into the voice data, the voice data is generated by adjusting at least one of an intensity, a tempo, and an intensity change pattern of a voice signal according to each section of the candidate episode based on an emotional state analyzed by a first neural network model trained to classify a pattern of words as the section in which people are impressed, and
   wherein in the creating the manuscript, the second neural network model organizes an order of episodes with the highest emotional index by predicting an impression index of the created manuscript through the first neural network model.

2. The joint works production method of claim 1, further comprising:
   creating the impression index as a numerical value indicating the degree to which the evaluators are impressed by the episode based on the received brainwave information of the evaluators; and selecting episodes suitable for the subject of the joint works among the candidate episodes based on the created impression index.

3. The joint works production method of claim 2, wherein, the first neural network model is trained to determine the emotional state by dividing the section in which the candidate episode is impressed based on the impression index.

4. The joint works production method of claim 1, further comprising:

determining a stake, in the manuscript, of the participants who participated in the manuscript.

5. A joint works production server using collective intelligence, the joint works production server comprising:

a subject receiving unit configured to receive a subject of joint works from participants of the joint works production;

a subject classifying unit configured to classify, when the subject of the joint works is adopted, the adopted subject of the joint works by subjects;

an episode receiving unit configured to receive a candidate episode from each of the participants who selected the same subject among the classified subjects from the participants;

a voice data generating unit configured to convert each of the received candidate episodes into voice data and to transmit each candidate episode converted into the voice data to evaluators;

an impression index generating unit configured to receive brainwave information indicating a change in brainwaves of the evaluators according to the candidate episode converted into voice from the evaluators and calculate impression indexes by applying a higher weight to a time for brainwave detection of a specific frequency than an amount of change in the brainwaves;

an episode selecting unit configured to select episodes among the candidate episodes in order of the impression indexes; and a manuscript creating unit configured to create a manuscript by arranging a sequence of selected episodes using a second neural network model trained to determine a correlation between the selected episodes based on ontology;

wherein the voice data generating unit generates the voice data by adjusting at least one of an intensity, a tempo, and an intensity change pattern of a voice signal according to each section of the candidate episode based on an emotional state analyzed by a first neural network model trained to classify a pattern of words as the section in which people are impressed, and wherein the second neural network model organizes an order of episodes with the highest emotional index by predicting an impression index of the created manuscript through the first neural network model.

6. The joint works production server of claim 5, further comprising:

the episode selecting unit configured to select episodes suitable for the subject of the joint works among the candidate episodes based on the created impression index.

7. The joint works production server of claim 6, wherein the first neural network model is trained to determine the emotional state by dividing the section in which the candidate episode is impressed based on the impression index.

8. The joint works production server of claim 5, further comprising:

a stake determining unit configured to determine a stake, in the manuscript, of the participants who participated in the manuscript.

9. A non-transitory computer readable medium including one or more sequences of instructions that, when executed by one or more processors, causes the one or more processors to perform operations, comprising:

receiving a subject of joint works from participants of the joint works production;

classifying, when the subject of the joint works is adopted, the adopted subject of the joint works by subjects;

receiving a candidate episode from each of the participants who selected the same subject among the classified subjects from the participants;

converting each of the received candidate episodes into voice data;

transmitting each candidate episode converted into the voice data to evaluators;

receiving brainwave information indicating a change in brainwaves of the evaluators according to the candidate episode converted into voice from the evaluators;

calculating impression indexes by applying a higher weight to a time for brainwave detection of a specific frequency than an amount of change in the brainwaves;

selecting episodes among the candidate episodes in order of the impression indexes; and creating a manuscript by arranging a sequence of selected episodes using a second neural network model trained to determine a correlation between the selected episodes based on ontology;

wherein, in the converting into the voice data, the voice data is generated by adjusting at least one of an intensity, a tempo, and an intensity change pattern of a voice signal according to each section of the candidate episode based on an emotional state analyzed by a first neural network model trained to classify a pattern of words as the section in which people are impressed, and wherein in the creating the manuscript, the second neural network model organizes an order of episodes with the highest emotional index by predicting an impression index of the created manuscript through the first neural network model.

* * * * *